(12) United States Patent
Fatemi et al.

(10) Patent No.: US 11,216,372 B2
(45) Date of Patent: *Jan. 4, 2022

(54) EXECUTION MANAGER FOR BINARY OBJECTS OPERATING ACROSS PRIVATE ADDRESS SPACES

(71) Applicant: TIBCO SOFTWARE INC., Palo Alto, CA (US)

(72) Inventors: Reza Fatemi, Mission Viejo, CA (US); John Driver, Sunnyvale, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/706,326

(22) Filed: Dec. 6, 2019

(65) Prior Publication Data

US 2020/0110699 A1    Apr. 9, 2020

Related U.S. Application Data

(63) Continuation-in-part of application No. 15/582,336, filed on Apr. 28, 2017, now Pat. No. 10,528,391.

(60) Provisional application No. 62/338,702, filed on May 19, 2016.

(51) Int. Cl.
*G06F 9/48* (2006.01)
*G06F 12/06* (2006.01)
*G06F 9/50* (2006.01)

(52) U.S. Cl.
CPC ........ *G06F 12/0646* (2013.01); *G06F 9/4881* (2013.01); *G06F 9/5016* (2013.01); *G06F 2212/1041* (2013.01)

(58) Field of Classification Search
CPC .................................................... G06F 9/4881
See application file for complete search history.

(56) References Cited

U.S. PATENT DOCUMENTS

2017/0083724 A1    3/2017  Chhabra et al.

OTHER PUBLICATIONS

High Availability and Scalability of Mainframe Environments using System z and z/OS as example, 2013, Kit Scientific Publishing (Year: 2013).

*Primary Examiner* — Charlie Sun
(74) *Attorney, Agent, or Firm* — McGuire Woods LLP

(57) ABSTRACT

Techniques are disclosed to operate binary objects across private address spaces. In various embodiments, a private shared memory segment is allocated for two non-privileged address spaces, the first comprising a home address space and the second comprising a target address space. One or more executable modules are loaded in a private address space of the home address space. One or more program call routines and an environment to schedule system request blocks (SRB) are built in the home address space. The environment to schedule system request blocks is configured to be used to schedule an SRB into the target address space, the SRB comprising information configured to cause the target address space to cause an associated one of the executable modules to execute.

20 Claims, 3 Drawing Sheets

EXECUTION MANAGER FOR BINARY OBJECTS OPERATING ACROSS PRIVATE ADDRESS SPACES

CROSS REFERENCE TO OTHER APPLICATIONS

This application is a continuation-in-part of patent application Ser. No. 15/582,336 filed Apr. 28, 2017 which claims priority to U.S. Provisional Patent Application No. 62/338,702 entitled EXECUTION MANAGER FOR BINARY OBJECTS OPERATING ACROSS PRIVATE ADDRESS SPACES, filed May 19, 2016, both of which are incorporated herein by reference.

BACKGROUND OF THE INVENTION

For most operating systems, applications running on the operating system typically operate mostly in isolation from each other. An operating system may provide a mechanism for applications to exchange information, but typically such mechanisms are subject to a number of restrictions and limitations.

For example, z/OS is an operating system for IBM® mainframes, produced by IBM. The range of virtual addresses that the z/OS operating system assigns to a user or separately running program is called an "address space". Each "address space" comprises an area of contiguous virtual addresses available to a program to execute instructions and store data. The use of address spaces allows z/OS to maintain the distinction between the programs and data belonging to each address space. By design, the private areas in one user's address space are intended to be isolated from the private areas in other address spaces. Each address space also contains a common area that is accessible to every program within the address space. Typically, an application stores its data in the private area of an address space.

Applications running in isolation may compete with each other for resources, such as the use of CPU engines or other hardware and/or software resources of the system. Shared, concurrent access to objects, such as files, may not be provided by the operating system alone.

BRIEF DESCRIPTION OF THE DRAWINGS

Various embodiments of the invention are disclosed in the following detailed description and the accompanying drawings.

DETAILED DESCRIPTION

Figure 1:
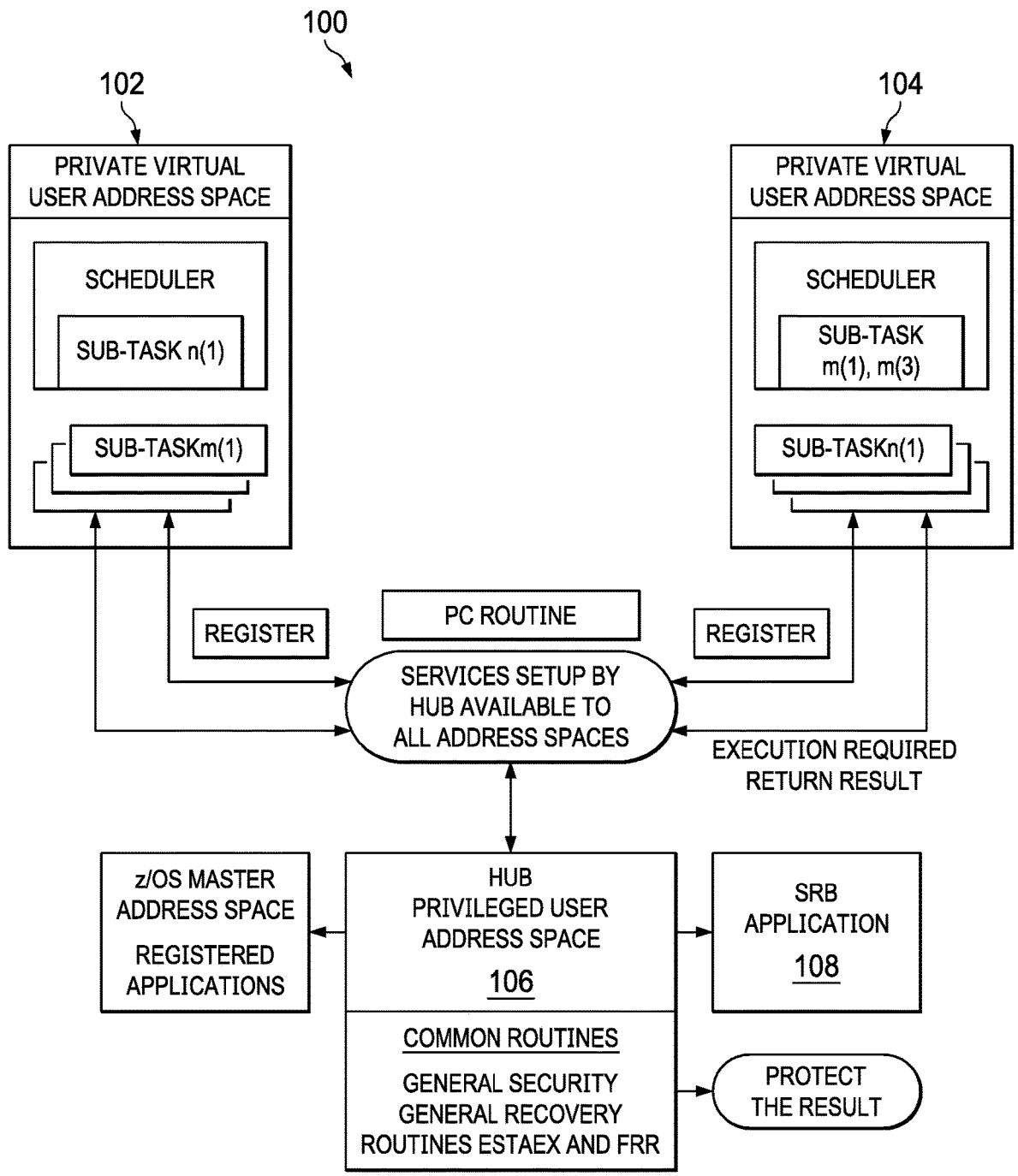
FIG. 1 is a block diagram of a system algorithm for managing access to private virtual user address space subtasks for non-privileged user address spaces.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to enable binary objects to operate across private address spaces are disclosed. In various embodiments, the limitations of cross-system and/or cross-memory facilities provided by an underlying operating system may be avoided at least in part by providing binary objects, e.g., functions, that operate in a "home" or "owning" address space portion of a shared memory segment. A Service Request Block (SRB) or equivalent is schedule in a target address space portion of the shared memory segment, such as a target address space associated with a user application. The target address space is prompted to invoke (e.g., via an API or other service call) an executable module (e.g., function) that has been loaded into the home address space. In various embodiments, the SRB causes other work in the target address space to be suspended until an indication is received that the executable module (e.g., function) has finished. In various embodiments, the SRB causes an IRB (asynchronous exit to be scheduled) in the target address space until an indication is received that the executable module (e.g., function) has finished.

In various embodiments, the solution provides a generalized solution for all users of the resident binary modules to recover from abnormal terminations to ensure integrity of their executions with respect to user data and assets.

In various embodiments, techniques disclosed herein may be used to do one or more of the following:

Creates a workload manager enclave for applications to utilize operating system-provided resources, such as IBM mainframe specialty engines.

Provides a process that manages virtual storage and storage protection from unwanted users.

Provides the capability to throttle the percentage of workload being routed to the specialty engine.

Provides protection against abnormal termination of user code in unwanted addressing modes (I.e., Cross memory, SRB, Access Register mode).

Provides asynchronous or synchronous processing for the application requests depending on the request type.

Grants any high level language binary module the ability to execute in a target or system address space as a part of that target address space.

In some embodiments, techniques disclosed herein are used to provide the ability to operate binary objects across private address spaces in a mainframe computing environment, such as an IBM mainframe computer. The "Z Series Operating System" or "z/OS" is an operating system for IBM mainframes. The range of virtual addresses that the z/OS operating system assigns to a user or separately running program is called an "address space". Each "address space" comprises an area of contiguous virtual addresses available to a program to execute instructions and store data. The use of address spaces allows z/OS to maintain the distinction between the programs and data belonging to each address space. By design, the private areas in one user's address space are intended to be isolated from the private areas in other address spaces. Each address space also contains a common area that is accessible to every other address space.

In z/OS, units of work are represented by two kinds of control blocks: Task Control Blocks (TCBs) and Service Request Blocks (SRBs). TCBs represent tasks executing within an address space, such as user programs and system programs that support the user programs. An SRB represents a request to execute a system service routine. SRBs provide a mechanism for communication between address spaces. Only programs running in a mode of higher authority called "supervisor state" can create an SRB. A program with "supervisor state" authority may use an SRB to initiate a process in another address space or in the same address space. The SRB is asynchronous in nature and runs independently of the program that issues it.

A program having supervisor state authority obtains storage and initializes the SRB with things such as the identity of the target address space and pointers to the code that will process the request. The program creating the SRB then issues ("schedules") the SRB and indicates whether the SRB has global (system-wide) or local (address space-wide) priority. SRBs with a global priority have a higher priority than that of any address space, regardless of the actual address space in which they will be executed. SRBs with a local priority have a priority equal to that of the address space in which they will be executed, but higher than any TCB within that address space.

FIG. 1 is a block diagram of a system algorithm for managing access to private virtual user address space sub-tasks for non-privileged user address spaces, according to certain example embodiments, denoted generally as 100. The algorithm 100 comprise non-privileged user address spaces 102, 104, at least one sub-task associated within a private virtual address space of address space 102, at least one other sub-tasks within another private virtual address space of address space 104, and a hub 106. The algorithm 100 functions to allow the sub-tasks to access services of other sub-tasks within another private virtual address space by issuing SRB's. Traditionally, because the sub-tasks are associated with private virtual address spaces of non-privileged user address spaces, access, i.e. system requests, are limited to only other sub-tasks within the private virtual address space and to address spaces associated with privileged users. In the latter case, the privileged user can call any sub-task using an SRB. Privileged and non-privileged users, as used herein, refers to identifiers associated with the applications of an operating system and privileges, i.e. granted permissions, associated therewith. A user address space refers to an address space for an instantiated application. Sub-tasks as used herein refers to instantiable and executable sub-tasks within a private virtual address space of an instantiated application. The hub 106 is privileged user address space that manages hub service access to operating system applications, maintains records of the registered applications, and access to an SRB application 108 that issues SRB's.

User address spaces 102, 104, e.g. upon instantiation, register with the hub 106. The registration includes sub-task identifiers, e.g. identifiers for sub-tasks m(1) to m(30) for user address space 102 and identifiers for sub-tasks n(1) to n(27) for user address space 104, and the user addresses and private virtual addresses. The hub 106 maintains a record of the registered applications and can allow or deny registration based on the identifiers and/or identifiers. After registration, all registered sub-tasks are visible and can be called by all other registered application sub-tasks. Sub-task m(1), e.g., from the private virtual address space of user address space 102 can schedule an SRB that identifies for execution sub-task n(1) from the private virtual address space of user address space 104. Additionally, sub-task n(1), e.g., can schedule another SRB from the private virtual address space of user address space 104 that identifies for execution sub-tasks m(1) and m(3), e.g., from virtual address space of user address space 102. In an embodiment, the user address spaces 102, 104 can create instantiations of the hub 106 and an operating system scheduler. In doing so, sub-tasks within private virtual address spaces can gain access to the permission rights of the hub 106 and, as such, can schedule an SRB to identify for execution a sub-task or sub-tasks in other private virtual address spaces. The system algorithm 100 can also access a Recovery Extended Specify Task Abnormal Exit (ESTAE/X) Module and a Recovery Functional Recovery Routine (FRR) Module. The Recovery FRR Module functions to perform recovery procedures when an exception occurs. The Recovery ESTAE Module also functions to perform recovery procedures when an exception occurs. ESTAE/X FRR allows the caller to intercept errors. Control is given to a caller-specified exit routine (called a recovery routine) in which the caller can perform various tasks, including diagnosing the cause of the error and specifying a retry address to avoid abnormal ending. Although the hub 106 provides sub-tasks within a non-privileged user address space 102, 104 certain privileges that is usually only reserved for a privileged user, the z/OS controls ultimate permission rights to all sub-tasks. In other words, a sub-task in a non-privileged user address space 102, 104 may have permission from the hub 106 to access a sub-task of another address space but the z/OS can revoke that permission. This is to prevent unauthorized access to certain information, such as passwords and encryption keys.

Figure 2:
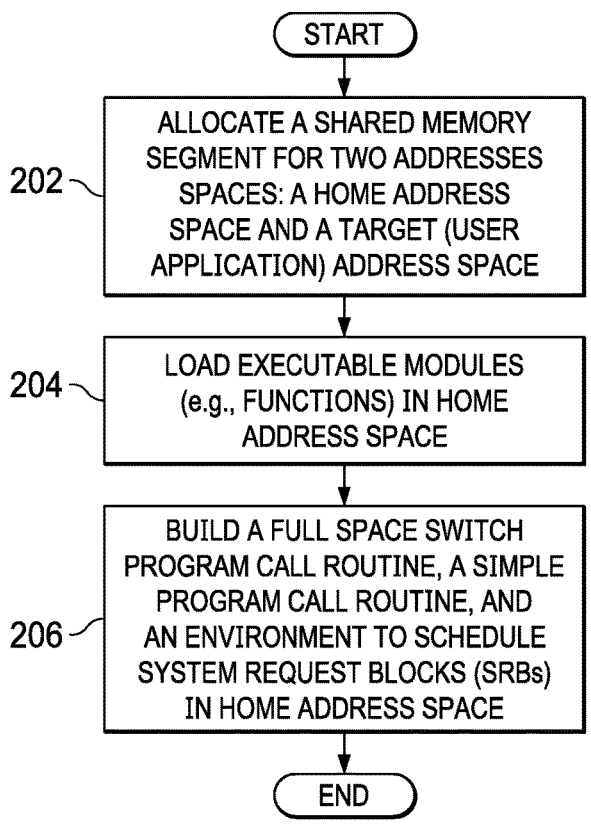
FIG. 2 is a flow diagram illustrating an embodiment of a process to configure a system to operate binary objects across private address spaces.

FIG. 2 is a flow diagram illustrating an embodiment of a process to configure a system to operate binary objects across private address spaces. In some embodiments, the process of FIG. 2 may be used to set up the system and environment 100 of FIG. 1. In the example shown, a shared memory segment is allocated for two address spaces: a home address space and a target (e.g., user application) address space (202). Executable modules (e.g., functions) are loaded into the home address space (204). A full space switch program call routine, a simple program call routine, and an environment to schedule system request blocks (SRBs) are built in the home address space (206).

Figure 3:
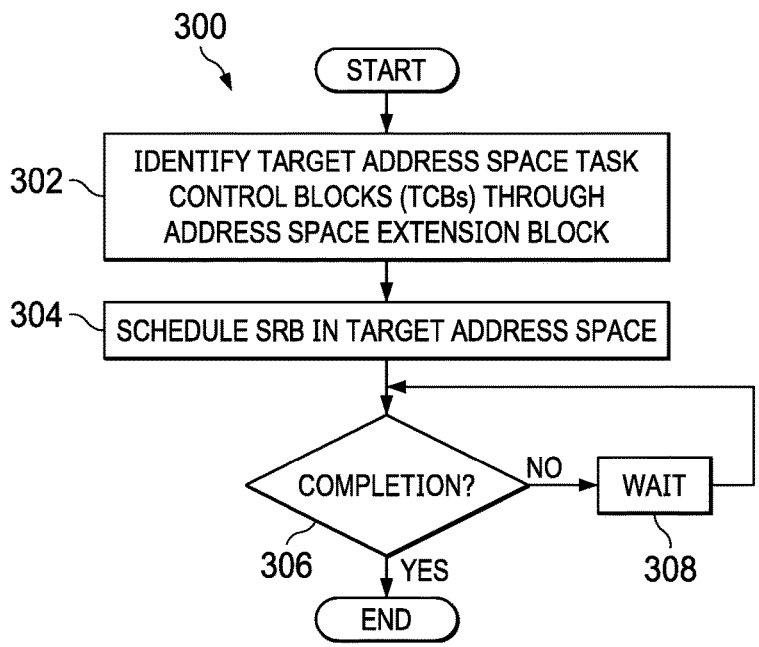
FIG. 3 is a flow diagram illustrating an embodiment of a process to operate binary objects across private address spaces.

FIG. 3 is a flow diagram illustrating an embodiment of a process to operate binary objects across private address spaces. In some embodiments, a home ("owning") address space such as home address space 102 of FIG. 1 may perform the process 300 of FIG. 3. In the example shown, one or more task control blocks (TCBs) of a target address space are identified though the address space extension block (302). In various embodiments, a target address space may have many subtasks (TCBs) that perform asynchronous work on behalf of that address space. In some embodiments, the list of subtasks (e.g., address of all TCB's) may be kept in a chain in an address space extension block. To target a particular TCB, the address of the TCB that the SRB would get scheduled in is found. In some embodiments, this is done by obtaining the TCB chain address from the address space extension block. An SRB is scheduled in the target address space (304). Until the binary object (e.g., function) associated with the SRB has been invoked and has executed to completion (306), the process waits (308). Once any function within the process indicates that the invoked function has completed execution (306) the process of FIG. 3 ends.

Figure 4:
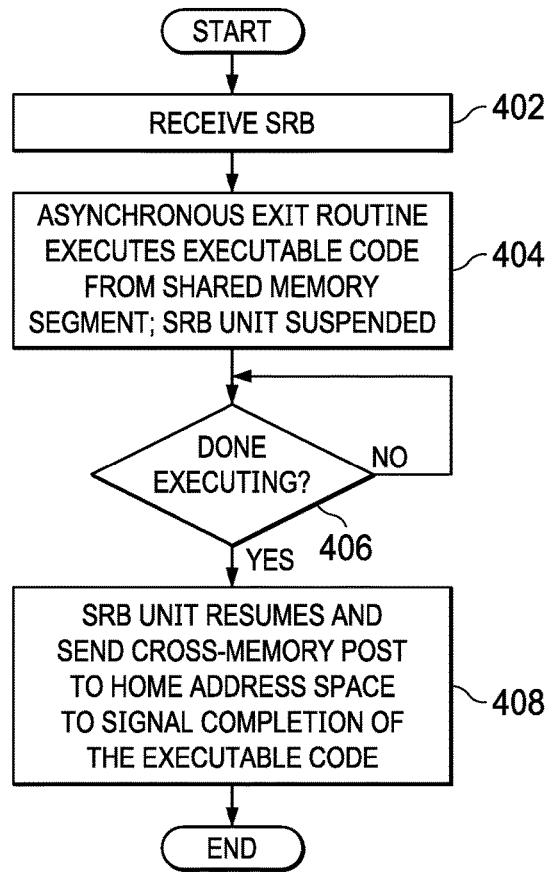
FIG. 4 is a flow diagram illustrating an embodiment of a process to operate binary objects across private address spaces.

FIG. 4 is a flow diagram illustrating an embodiment of a process to operate binary objects across private address spaces. In some embodiments, a target address space such as target address space 104 of FIG. 1 may perform the process of FIG. 4. In the example shown, an SRB originating from the home address space is received (402). An IRB asynchronous exit routine executes executable code from the shared memory segment (e.g., the home address space), and the SRB unit of the target address space is suspended (404). This allows full interrupts in a cross-memory environment without any cross-memory environment restrictions. The process waits until the executable code is done executing (406), e.g., until a completion indication is received, after which the SRB unit of the target address space resumes and a cross-memory post is sent to the home address space to signal completion of the executable code (408). At this point the target address space continues its execution until it requires this environment again.

Figure 5:
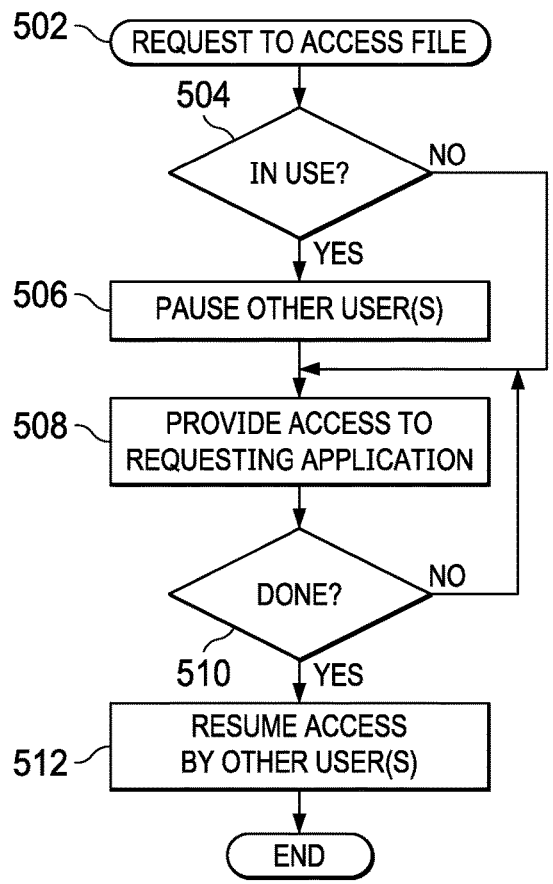
FIG. 5 is a flow diagram illustrating an embodiment of a process to use an ability to operate binary objects across private address spaces to provide shared access to a file.

FIG. 5 is a flow diagram illustrating an embodiment of a process to use an ability to operate binary objects across private address spaces to provide shared access to a file. In some embodiments, the process of FIG. 5 may be performed by a home address space, such as home address space 102 of FIG. 1, and/or an associated entity or process, such as an execution manager. In the example shown, a request to access a file is received (502). If the file is in use (504), e.g., by another user/application associated with another private address space, the use by the other user is paused (506) and access to the same copy in memory is provided to the requesting application (508) until an indication is received that the requesting application is done (510), and with time access by the other user(s) may resume (512). If the file is not in use (504), the file is read into memory and access is provided until done (508, 510). In some embodiments, the process of FIG. 5 may be used to provide access to a live copy of a file, e.g., for purposes of backup, while maintaining nearly continuous availability of the file to one or more other users (e.g., applications).

Figure 6:
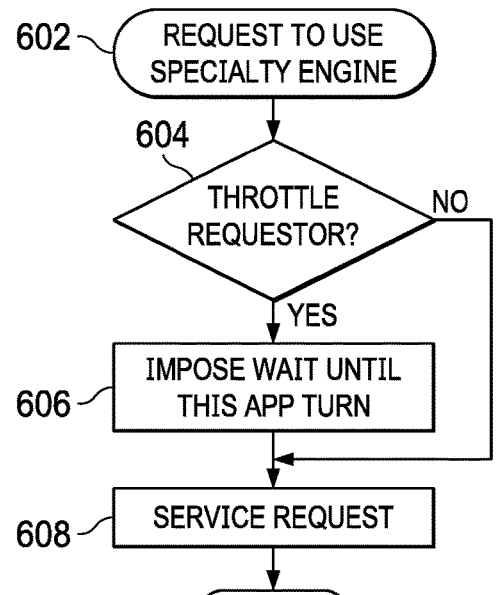
FIG. 6 is a flow diagram illustrating an embodiment of a process to use an ability to operate binary objects across private address spaces to manage access to a shared resource, such as a mainframe computer specialty engine.

FIG. 6 is a flow diagram illustrating an embodiment of a process to use an ability to operate binary objects across private address spaces to manage access to a shared resource, such as a mainframe computer specialty engine. In various embodiments, the process of FIG. 6 may be performed by a home address space and/or an associated entity. Applications associated with target address spaces may be configured to access specialty engines (or other resources) via the home address space. A request to use a specialty engine is received (602). If the request would result in the requesting user/application exceeding its allocated bandwidth of the specialty engine (604), the requesting user/application is required to wait (606) until it is once again its turn (e.g., within its allocated bandwidth) to use the specialty engine (606), at which time the request is serviced (608). If the requesting user/application has not exceeded its allocation (604), the request is serviced without delay (608).

Figure 7:
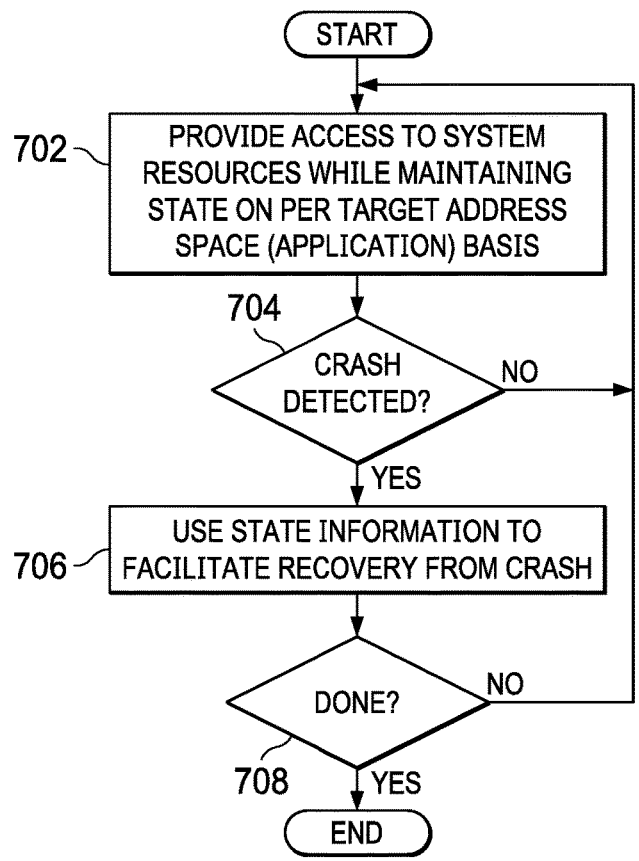
FIG. 7 is a flow diagram illustrating an embodiment of a process to use an ability to operate binary objects across private address spaces to facilitate crash recovery.

FIG. 7 is a flow diagram illustrating an embodiment of a process to use an ability to operate binary objects across private address spaces to facilitate crash recovery. In various embodiments, the process of FIG. 7 may be performed by a home address space and/or an associated entity. In the example shown, access to system resources is provided while maintaining state, e.g., at the home address space, on a per target address space (i.e., per user/application) basis (702). If a crash is detected (704), e.g., a user application associated with a given private address space crashes, the state information associated with the affected private address space is used to facilitate recovery from the crash (706). The process continues until done (708), e.g., the system is shut down.

In various embodiments, techniques disclosed herein may be used to provide users a platform where an interface using any high level language may execute in any address space local or foreign on behalf of the target address space. For example, a file can be closed or opened in the executing address space from any environment that does not provide this interface.

In various embodiments, execution in an address space on a remote address space is enabled. In some embodiments, to send shared memory data from one address space to another address space the z/OS execution manager protects and sends the memory data on behalf of the user application.

The solution, in various embodiments, optimizes memory between multiple address spaces using Shared Memory segments that minimize any storage to storage movement, providing for faster data transfer between address spaces. In various embodiments, techniques disclosed herein may be used in any environment that does not allow any type of interrupt.

An interrupt is an event that alters the sequence in which the processor executes instructions. An interrupt might be planned (specifically requested by the currently running program) or unplanned (caused by an event that may or may not be related to the currently running program). Six types of interrupts are currently used by z/OS, as follows:

Supervisor calls or SVC interrupts
    These interrupts occur when the program issues an SVC to request a particular system service. An SVC interrupts the program being executed and passes control to the supervisor so that it can perform the service. Programs request these services through macros such as OPEN (open a file), GETMAIN (obtain storage), or WTO (write a message to the system operator).

I/O interrupts
These interrupts occur when the channel subsystem signals a change of status, such as an input/output (I/O) operation completing, an error occurring, or an I/O device such as a printer has become ready for work.

External interrupts
These interrupts can indicate any of several events, such as a time interval expiring, the operator pressing the interrupt key on the console, or the processor receiving a signal from another processor.

Restart interrupts
These interrupts occur when the operator selects the restart function at the console or when a restart SIGP (signal processor) instruction is received from another processor.

Program interrupts
These interrupts are caused by program errors (for example, the program attempts to perform an invalid operation), page faults (the program references a page that is not in central storage), or requests to monitor an event.

Machine check interrupts
These interrupts are caused by machine malfunctions.

When an interrupt occurs, the hardware saves pertinent information about the program that was interrupted and, if possible, disables the processor for further interrupts of the same type. The hardware then routes control to the appropriate interrupt handler routine. The program status word or PSW is a key resource in this process.

The program status word (PSW) is a 128-bit data area in the processor that, along with a variety of other types of registers (control registers, timing registers, and prefix registers) provides details crucial to both the hardware and the software. The current PSW includes the address of the next program instruction and control information about the program that is running. Each processor has only one current PSW. Thus, only one task can execute on a processor at a time.

The PSW controls the order in which instructions are fed to the processor, and indicates the status of the system in relation to the currently running program. Although each processor has only one PSW, it is useful to think of three states of PSWs to understand interrupt processing:
Current PSW
New PSW
Old PSW The current PSW indicates the next instruction to be executed. It also indicates whether the processor is enabled or disabled for I/O interrupts, external interrupts, machine check interrupts, and certain program interrupts. When the processor is enabled, these interrupts can occur. When the processor is disabled, these interrupts are ignored or remain pending.

There is a new PSW and an old PSW associated with each of the six types of interrupts. The new PSW contains the address of the routine that can process its associated interrupt. If the processor is enabled for interrupts when an interrupt occurs, PSWs are switched using the following technique:
Storing the current PSW in the old PSW associated with the type of interrupt that occurred.
Loading the contents of the new PSW for the type of interrupt that occurred into the current PSW.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory; and
a processor coupled to the memory and configured to:
allocate a shared memory segment of the memory for two non-privileged address spaces, the first comprising a home address space and the second comprising a target address space;
load one or more executable modules in a private address space of the home address space; and
build in the home address space one or more program call routines and an environment to schedule system request blocks;
wherein the environment to schedule system request blocks is configured to be used to schedule an SRB into the target address space, the SRB comprising information configured to cause the target address space to cause an associated one of the executable modules to execute.

2. The system of claim 1, wherein the processor is further configured to identify a task control block (TCB) associated with the target address space.

3. The system of claim 1, wherein the target address space is configured to execute the executable module from the shared memory segment.

4. The system of claim 3, wherein the target address space uses an asynchronous exit routine to execute the executable module.

5. The system of claim 4, wherein an SRB unit of the target address space resumes upon completion of the executable module.

6. The system of claim 4, wherein a cross-memory post is sent by the target address space to the home address to signal completion of the executable module.

7. The system of claim 1, wherein the executable module comprises a function.

8. The system of claim 1, wherein the executable module provides shared access to a file or other stored object.

9. The system of claim 1, wherein the executable module provides managed access to a specialty engine.

10. The system of claim 1, wherein the target address space executes the executable code via an API or other service call.

11. A method, comprising:
allocating a shared memory segment of the memory for two non-privileged address spaces, the first comprising a home address space and the second comprising a target address space;
loading one or more executable modules in a private address space of the home address space; and
building in the home address space one or more program call routines and an environment to schedule system request blocks;
wherein the environment to schedule system request blocks is configured to be used to schedule an SRB into the target address space, the SRB comprising information configured to cause the target address space to cause an associated one of the executable modules to execute.

12. The method of claim 11, further comprising identifying a task control block (TCB) associated with the target address space.

13. The method of claim 11, wherein the target address space is configured to execute the executable module from the shared memory segment.

14. The method of claim 13, wherein the target address space uses an asynchronous exit routine to execute the executable module.

15. The method of claim 14, wherein an SRB unit of the target address space resumes upon completion of the executable module.

16. The method of claim 14, wherein a cross-memory post is sent by the target address space to the home address to signal completion of the executable module.

17. The method of claim 11, wherein the executable module comprises a function.

18. The method of claim 11, wherein the executable module provides shared access to a file or other stored object.

19. The method of claim 11, wherein the executable module provides managed access to a specialty engine.

20. A computer program product embodied in a non-transitory computer readable medium and comprising computer instructions for:
- allocating a shared memory segment of the memory for two non-privileged address spaces, the first comprising a home address space and the second comprising a target address space;
- loading one or more executable modules in a private address space of the home address space; and
- building in the home address space one or more program call routines and an environment to schedule system request blocks;
- wherein the environment to schedule system request blocks is configured to be used to schedule an SRB into the target address space, the SRB comprising information configured to cause the target address space to cause an associated one of the executable modules to execute.

* * * * *